United States Patent [19]
Campbell

[11] 3,834,788
[45] Sept. 10, 1974

[54] EPICYCLIC CAMERA

[76] Inventor: Rouel R. Campbell, 7064 E. 52nd, Tulsa, Okla. 74145

[22] Filed: Aug. 13, 1973

[21] Appl. No.: 387,957

[52] U.S. Cl.................. 352/84, 352/105, 352/204
[51] Int. Cl............................................. G03b 41/00
[58] Field of Search............ 352/84, 105, 106, 107, 352/108, 109, 110, 111, 112, 204

[56] References Cited
UNITED STATES PATENTS

| | | | |
|---|---|---|---|
| 3,257,899 | 6/1966 | Hoyt | 352/84 X |
| 3,523,722 | 8/1970 | Beaman | 352/84 |
| 3,583,798 | 6/1971 | Campbell | 352/84 |
| 3,743,393 | 7/1973 | Campbell | 352/84 |

*Primary Examiner*—Monroe H. Hayes
*Attorney, Agent, or Firm*—Mildred K. Flowers

[57] ABSTRACT

A high speed motion picture camera wherein the film moves continuously during a filming operation, and having an optical system of novel design through which the light passes continuously; hence the epicyclic camera principle in which the film, the shutter and the image are in coordinated motion. The film supply reel is of a diameter substantially equal to the stationary gear whereby the supply reel does not rotate as the camera accelerates, and the film unwraps as it follows the path of a planet sprocket. The film take-up reel operates on the same principle as the supply reel, but the take-up reel is driven and the acceleration is reduced by one revolution for each revolution of the epicyclic. The film may be made to move at the same rate as the image during expsoure, or for taking substantially any number of pictures per revolution with good picture quality and superior picture steadiness.

21 Claims, 12 Drawing Figures

EPICYCLIC CAMERA

CROSS-REFERENCE TO RELATED PATENT

This application is an improvement over my prior issued U.S. Pat. No. 3,743,393, issued July 3, 1973, and entitled "Epicyclic Camera."

BACKGROUND OF THE INVENTION

1. Field of the Invention

This invention relates to improvements in cameras and more particularly, but not by way of limitation, to a high speed motion picture camera. 2. Description of the Prior Art There are many instances wherein it is desirable to photograph movement or action at extremely high speeds. For example, in the study of stress, or the like, on the working elements of a machine in operation, a fast or high speed motion picture of the apparatus during the actual operation thereof provides a film which may be projected at a substantially reduced rate of speed which permits viewing of the working elements or mechanical parts for studying thereof during the actual working conditions. For best results in this type of photography, it is desirable to photograph the machine operation at ultra high frame rates, such as at 10,000 frames per second, and above, to arrest motion for study. Presently available ultra high speed cameras are normally of the polygon prism type embodying many inherent defects, such as poor resolution at the corners of the picture, unsteadiness, and low light acceptance. The polygon prism normally has eight sides and a high speed of 75,000 R.P.M. at 10,000 frames per second.

SUMMARY OF THE INVENTION

The present invention relates to a novel high speed motion picture camera of an epicyclic type particularly designed and constructed wherein the film is stationary in space and the nodel point of the projection lens is on the optical axis at the point of the ninety degree reflection. All other embodiments are for other than on the optical axis at the ninety degree reflecting mirror which is on the center of the stationary gear or gear pulley horizontal axis. The novel camera will photograph at twice the frame rate of the normal high speed camera available today without increasing the acceleration on the film. Time, acceleration and stress are the speed limiting factors. For example, at the epicyclic speed of 937.5 R.P.M. the frame rate would be 1,000 frames per second for 16 mm film. This is particularly possible because the film moves continuously, thus providing potential for ultra high speed when the intermittent feature of the usual motion picture camera is eliminated or modified.

The novel epicyclic camera comprises a combination of elements comprising an objective lens, a relay lens system, a dove prism, a shutter, mirror and film reels disposed co-axially and so cordinated in a planetary motion or epicyclic in principle to expose picture frames on movie camera film of substantially any size. There are many advantages of this novel method, as follows:

1. Freedom to design optical systems to accept all of the light the objective lens will collect.
2. Freedom to design for any number of pictures in one revolution of the epicyclic wheel, thereby controlling the number of turns per frame per second.
3. Picture steadiness because of the single optical system versus multi system in a polygon prism.

The purpose of the dove prism used in the epicyclic camera is to prevent tumbling of the picture on the film. The prism is rotated at a speed one half that of the speed of rotation of the film carrying wheels, and also positions the picture properly on the film for standard projection. The dove prism also permits the camera to be used for trick photography by altering the orientation of the prism to change the position of the image on the film; and for other useful purposes, such as photographing an object not having a top or bottom, such as in outer space, but which may best be viewed from a certain position. The dove prism will permit this desired orientation of the image of the object on the film strip.

A cylindrical lens system may also be used in which magnification occurs in one direction only, and used in combination with a shutter belt having slits spaced therealong to span the height of the magnification. The magnification is preferably 2 to 1, but not limited thereto, and the rate of the shutter speed is preferably one slit for each frame of film.

It will be apparent that a circle with a two times magnification in one direction only will produce an oval image. However, if the slit in the shutter belt is made to expose the film as it moves, the slit must travel faster than the film in order to cover the entire frame during the movement of one frame. Thus, the oval of the image is compressed to a circle and the distortion is corrected while the film and shutter are in motion. In other words, with the cylindrical lens system, the picture is distorted and corrected while the film and shutter are moving. Of course, the laws of optics and the laws of mechanics in a static state are not compatible with this result, but if motion is added, a compensating means is created.

The photographic principle of the epicyclic camera may be likened to a paint brush wherein the brush and the film are stationary in space for that moment in time by proper timing of the slit type shutter while all three, the picture, the film and the shutter, are travelling as planets in space. An adjustable objective lens is provided for the camera and suitable lenses are disposed within the camera for receiving the image from the objective lens. The objective lens may rotate with the dove prism, if desired for facilitating maintaining of the light beam on axis. The image is picked up from the objective lens and transmitted to the film through the reflecting or optical system in a one to one ratio, or unity. These lenses are of a sufficient size to accept all the light collected by any objective lens.

The film strip is disposed at the focal point of the lens during exposure thereof, and moves continuously during a filming operation. The focal point may be at substantially any distance from the lens as the mechanical elements of the camera permit. A secondary aperture is provided as close to the film portion being exposed as possible, with a secondary aperture being of substantially the same size as the aperture in the usual C-mount (for 16mm film only). A pair of sprockets are provided with one of said sprockets pulling the film across the shutter aperture for exposure. This substantially precludes stretching of the film during the high speed operation of the camera. In addition, the sprockets preferably include at least one polygon sprocket for producing variable velocity of the film so that during the reduced velocity it may be made to coincide with the image velocity. The film may be moved through the camera at high frame rates, limited only by the frame size and the tensile strength of the film. Time, acceleration and stress, accordingly, are the speed limiting factors.

DESCRIPTION OF THE PREFERRED EMBODIMENT

Referring to the drawings in detail, reference character 10 generally indicates an epicyclic motion picture camera comprising an outer housing 12 having a barrel 14 provided thereon. The housing 12 is preferably of a substantially circular configuration, but not limited thereto, and is provided with an outwardly and downwardly (as shown in the drawings) extending casing portion 16 for housing the usual motor 18 therein. The motor 18 may be mounted in the casing 16 in any suitable manner (not shown), and the usual electronic controls (not shown) normally utilized in high speed cameras, and suitable thermal controls (not shown) for control of the speed and heating conditions of the camera may be suitably mounted in the casing portion 16, as desired. Of course, a suitable on-off switch (not shown) may be mounted on the outer surface of the casing 16 and operably connected with the motor 18, electronic controls and thermal controls for selective control thereof, as is well known, and a suitable electrical conduit (not shown) is operably connected with the electrical components of the camera for connection with a suitable power source (not shown) as is well known.

A gear wheel 20 is suitably keyed or splined to the drive shaft 22 of the motor 18 for rotation thereby. A circular or substantially cylindrical housing 24 having a central hub member 26 is journalled in a sleeve member 28 which may be integral with the housing 12, as particularly shown in FIG. 1. The outer periphery of the housing 24 is provided with a toothed portion 30 in substantial alignment with the gear wheel 20, and a gear belt 32 extends around the gear wheel 20 and toothed portion 30 whereby rotation is transmitted to the housing 24. A suitable relay lens system 34 is disposed within the hub 26 and secured therein in any suitable manner (not shown) and rotates simultaneously therewith. Of course, suitable bearing members 36 are preferably interposed between the hub 26 and the sleeve 28 for facilitating relative rotation therebetween.

A gear 38 is secured around the outer periphery of the hub 26 in the proximity of the outer end thereof and spaced beyond the sleeve 28. A complementary gear 40 is disposed in substantial alignment with the gear 38 and is carried by a shaft 42 which is suitably journalled in an annular chamber 44 provided in the housing 12 surrounding the barrel 14. The gear 40 is keyed or otherwise secured to the shaft 42 for simultaneous rotation therebetween, and a gear belt 45 extends around the gears 38 and 40 for transmitting rotation therebetween. It will be apparent that the gear 38 rotates simultaneously with the housing 24, thus transmitting rotation to the gear 40 and thence to the shaft 42. A gear 46 is keyed or otherwise secured to the shaft 42 for rotation thereby. The gear 46 is of a selected tooth ratio with respect to the gear 40, with the ratio therebetween preferably being two to one, with the gear 40 being provided with twice the number of teeth as the gear 46 for a purpose as will be hereinafter set forth. For example, 64 teeth for the gear 40 and 32 teeth for the gear 46 has been found to provide excellent operational results in the camera 10.

A gear 48, preferably of a size complementary to the gear 38, is disposed in substantial planar alignment with the gear 46 spaced from the gear 38. The gear 48 is suitably secured around the outer periphery of a sleeve 50 which is journalled in the barrel 14 by suitable bearings 52, and one end of which extends into the hub 26, as particularly shown in FIG. 1. A gear belt 53 extends around the gears 46 and 48 for transmitting rotation therebetween. It will be apparent that the speed of rotation of the gear 48 will be one-half the speed of rotation of the gear 38 due to the gear teeth ratio between the gears 40 and 46. Thus, the speed of rotation of the sleeve 50 will be twice the speed of rotation of the housing 24 when the gear ratio between the gears 40 and 46 is two to one as hereinbefore set forth.

A dove prism 54 is suitably anchored or secured within the sleeve 50 for rotation simultaneously therewith, in the manner and for the purpose as set forth in my aforementioned copending application. The dove prism 54 is disposed in substantial axial alignment with a suitable objective lens 56 and the usual C-mount (for 16 mm film only for purposes of illustration) therefor provided in the barrel 14, as is well known; and with a second suitable lens means 58 disposed in the barrel 14 between the lens 56 and prims 54. The lens 56 may be of any desired type or size, such as a 25 millimeter lens but not limited thereto. The lens 56 may be manually moved or slid within the barrel 14 and may be locked in place in any suitable manner (not shown) in order to facilitate or achieve the desired focusing for the operation of the camera 10. The lens 58 may be of any suitable type, but is preferably an achromatic lens and is of a size to accept all of the light admitted into the camera 10 through the lens 56. For example, the lens 58 may preferably be an F1 lens. In addition, the lens 58 is preferably a collimater and is preferably spaced from the lens 56 a sufficient distance for interrupting the image prior to the focus point of the lens 56 and receiving the image therefrom. The lens 58 may be adjustably disposed within the barrel 14 for slidable movement therein, and may be securely retained in the selected position therefor in any well known manner, such as by a set screw, or the like (not shown). The prism 54 receives the image from the lens 58 and transmits the image in a manner as will be hereinafter set forth.

A suitable bracket or support member 60 is secured to the rearwardly directed flange 62 of the housing 24 in substantial alignment with the central hub 26 for supporting a suitable angularly disposed reflecting member 64 which receives the image from the prism 54, as set forth in my aforementioned copending application, for reflecting the image to the film strip 66 in a manner as will be hereinafter set forth.

Figures 1, 1A:
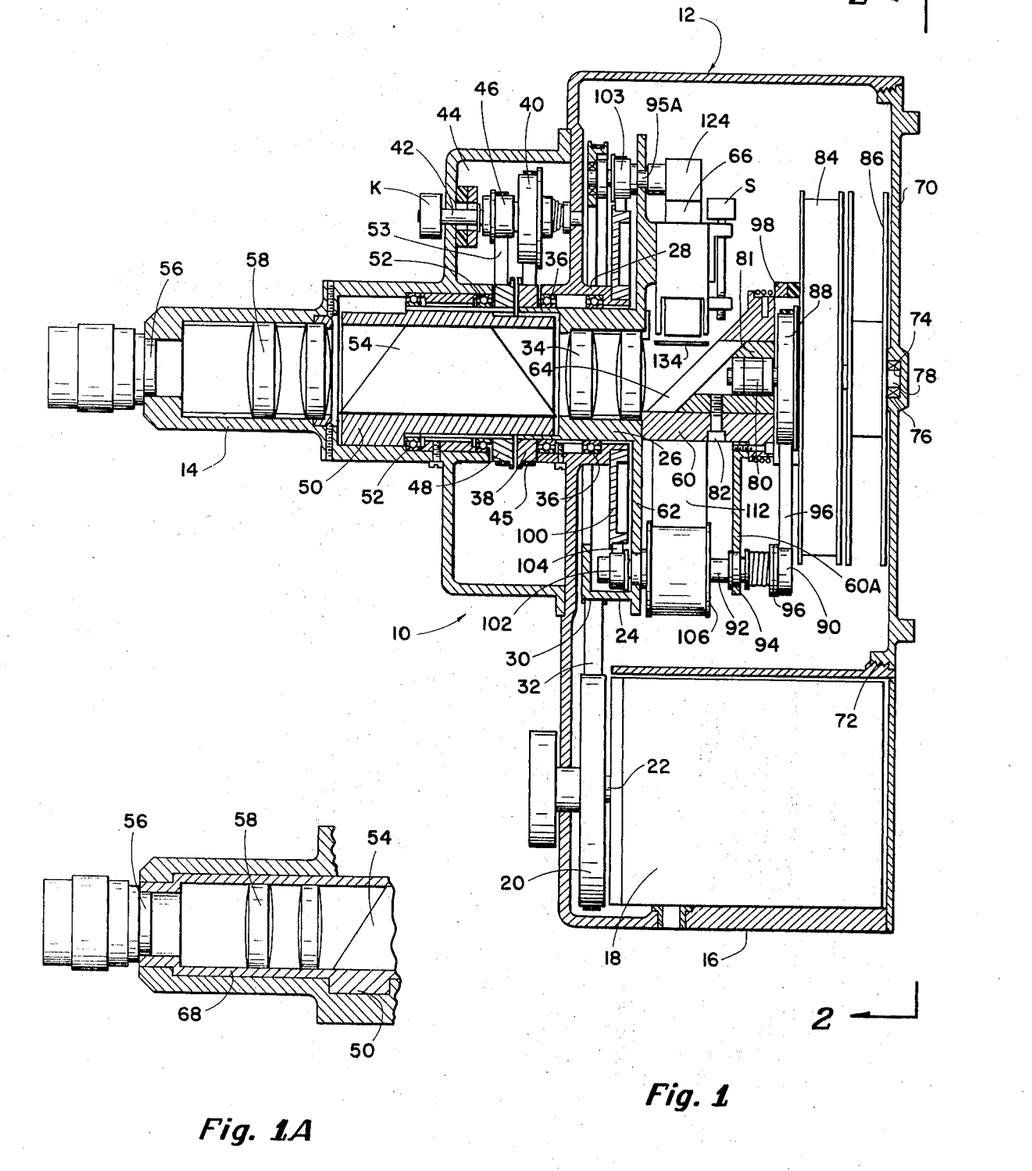
FIG. 1 is a sectional elevational view of a motion picture camera embodying the invention.
FIG. 1A is a sectional elevational view of a portion of a modified lens system which may be utilized in the invention.

As an alternative lens system, attention is particularly directed to FIG. 1A wherein the sleeve 50 is provided with a forwardly extending tubular or sleeve projection member 68 which may be integral with the sleeve 50 or suitably secured thereto for rotation simultaneously therewith. The sleeve 68 extends longitudinally within the barrel 14 and the objective lens 56 and lens 58 may be suitably mounted or secured within the sleeve extension 68 for rotation simultaneously with the dove prism 54. Of course, the objective lens 56 may be rotated simultaneously with the dove prism 54 in any suitable manner, and is not limited to the particular arrangement for rotation shown herein. The rotation of the objective lens with the dove prism has been found to facilitate keeping of the light beam on axis. If the light beam is not kept on axis, the beam may wobble, and the wobble of the beam will cause the image to wobble, which is undesirable.

The housing 12 is provided with a rear access plate or door 70 which may be removably secured thereto in any well known manner, such as by a threaded connection 72 or a hinged connection (not shown), or the like. A recess or detent 74 is provided on the inwardly directed surface of the door 70 in substantial axial alignment with the sleeve 50 and hub 26 for receiving suitable bearing means 76 therein to support one end of a shaft 78. The opposite end of the shaft 78 is supported in a bushing 80, or the like, which is secured within a sleeve 81 by a bolt, or the like (not shown). The sleeve 81 is secured to the support bracket 60 in any suitable manner, such as by a bolt 82. A film supply reel 84 is suitably disposed on the shaft 78 for free rotation with respect thereto and coaxial with respect to a film takeup or storage reel 86 which is secured on the shaft 78 in any suitable manner for rotation thereby. The film strip 66 passes from the film supply reel 84 to the film take-up reel 86 during a filming operation in a manner as will be hereinafter set forth.

A suitable pulley 88 is also carried by the shaft 78 and may be keyed or otherwise secured thereto for simultaneous rotation therebetween. A second pulley 90 is disposed in substantially coplanar relationship with respect to the pulley 88 and is spaced therefrom as clearly shown in FIGS. 1 and 2. The pulley 90 is carried by a shaft 92 which is supported by the rear flange 62 of the housing 24 and a bracket 94 secured to the bracket 60. A gear belt 96 extends between and around the pulleys 88 and 90 for transmitting rotation therebetween. In addition, a suitable spring urged clutch mechanism 96 is disposed on the shaft 92 in engagement with the pulley 90, and a spring urged friction member or clutch 98 engages the film supply reel 84 for a purpose as will be hereinafter set forth.

A gear 100 is suitably secured to the hub 28 of the housing 12 and remains stationary therewith. A gear 102 is suitably secured on the shaft 92 on the opposite side of the flange 62 with respect to the gear 96 as clearly shown in FIG. 1. A pair of spaced gears 101 and 103 are keyed or otherwise secured to spaced shafts 95 and 95a (only one of which is shown in FIG. 1) and disposed in substantial coplanar alignment with the gear 102. The shafts 95 and 95a are suitably journalled in the flange 62 or housing 24. The gears 101, 102 and 103 travel around the gear 100 in the manner of a planet around a sun as the housing 24 is rotated about its central axis. A gear belt 104 extends between and around the gears 100, 101, 102, and 103, and since the gear 100 is stationary, rotation is transmitted to the gears 101, 102 and 103 for transmitting rotation to the shafts 92 and 95.

A flanged gear 106 is secured on the shaft 92 between the gears 90 and 102, and on the opposite side of the flange 62 with respect to the gear 102, and is keyed or otherwise secured to the shaft 92 for rotation simultaneously therewith. A pair of gears 108 and 110 (FIG. 2) are journalled on the rear face of the flange 62 in any suitable manner and are substantially coplanar with the gear 106. A geared shutter belt 112, generally similar to the shutter belt shown in my aforementioned application, extends around the gears 106, 108 and 110, and is moved continuously therearound during operation of the camera 10, as will be hereinafter set forth. The path of travel of the shutter belt 112 is above the reflector lens or element 64, as particularly shown in FIG. 1, and is interposed between the lens 64 and the film 66 in order that the film 66 is exposed only as the slits 113 (FIG. 6) of the shutter belt pass between the reflector element 64 and the film 66, as is well known, and as set forth in my aforementioned patent.

A flanged roller system generally similar to that shown in my aforementioned patent is provided for moving the film 66 through the camera 10 during operation thereof. For example, first flanged roller means 114 (omitted from FIG. 1 for purposes of illustration) are suitably journalled on a bracket means 116 which may be secured to the flange 62, or otherwise secured for movement simultaneously with the housing 24. Second flanged roller means 118 (also omitted from FIG. 1 for purposes of illustration) is similarly journalled on a bracket means 120 which may be secured to the flange 62 or otherwise secured for movement simultaneously with the housing 24. Each of the roller means 114 and 116 may comprise a pair of aligned rollers, as shown in my aforementioned patent, but only one roller is shown in each instance in FIG. 2.

Sprocket members 122 and 124 are keyed or otherwise secured to the shafts 95 and 95a (FIG. 4) for engaging the perforations of the film 66 in order to move the film through the camera 10 during operation thereof, as is well known. In addition, suitable rollers or wheels 126 and 128 are freely journalled on suitable bracket members 130 and 132, respectively, for receiving the film 66 therearound and facilitating the guiding of the movement of the film through the camera 10. It is preferable that the sprocket 124 be of a polygon configuration around its outer periphery, as particularly shown in FIG. 4, whereby the film 66 lays against the flat sides thereof as the film moves thereover. This has been found to permit movement of the film at variable speeds, and at substantially the same speed or velocity as the image velocity.

Figure 2:
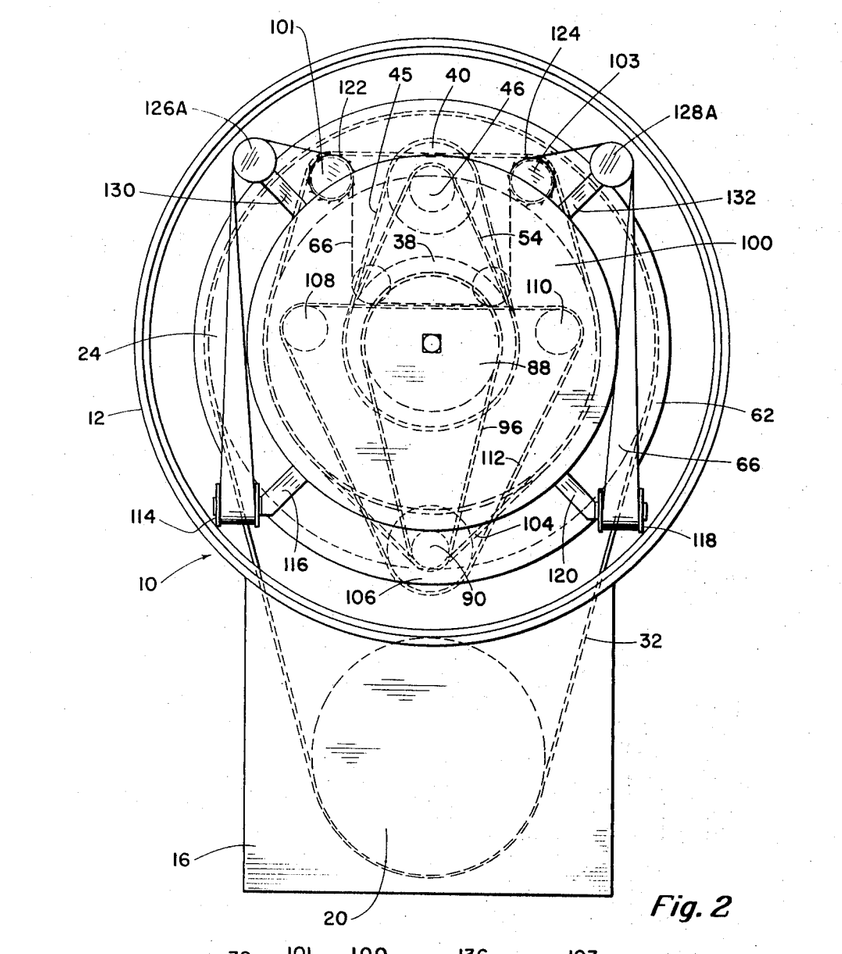
FIG. 2 is a view taken on line 2—2 of FIG. 1.
Figure 2A:
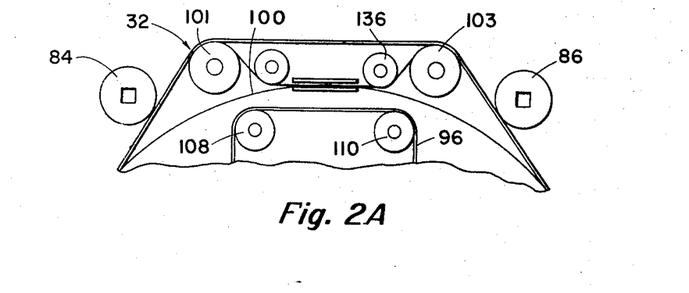
Figure 4:
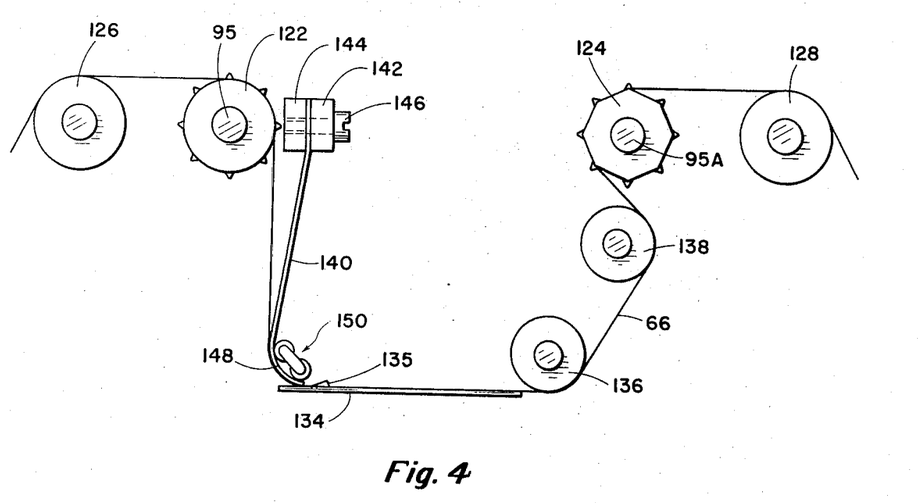
FIG. 4 is a side elevational view fof a short dwell mechanism used in the invention.

The usual film guide plate 134 having the usual register pin 135 (FIG. 4) is suitably secured to the rear face of the flange 62 at the focal point of the lens 56 and is interposed between the gears 108 and 110. A pair of tension rollers 136 and 138 (only one of which is shown in FIG. 2) are suitably journalled on the flange 62 and interposed between the guide plate 134 and sprocket 124 for receiving the film 66 therearound, as is particularly shown in FIG. 4. A suitable film loop spring 140 is secured to the flange 62 in any suitable manner, such as by a pair of complementary flanges 142 and 144 and a bolt 146 threadedly engaged therewith, as is well known. The outer end 148 of the loop spring 140 is disposed in the proximity of the guide plate 134 and between the guide plate 134 and sprocket 122 for receiving the film 66 therearound, as shown in FIG. 4. In addition, mini-ball bearing means 150, preferably comprising a pair of ball bearings, but not limited thereto, is suitable secured to the flange 62 and engageable with the end 148 of the loop spring 140 for yieldably retaining said end 148 in engagement with the film 66 during operation of the camera 10.

The film guide plate 134 is provided with the usual aperture 152 (FIG. 6) in substantial alignment with the film 66 and interposed between the film 66 and reflector 64 for receiving the image therefrom and permitting transmitting of the image to the film during movement of the shutter belt 112, as set forth in my aforementioned patent.

Figures 5, 5A:
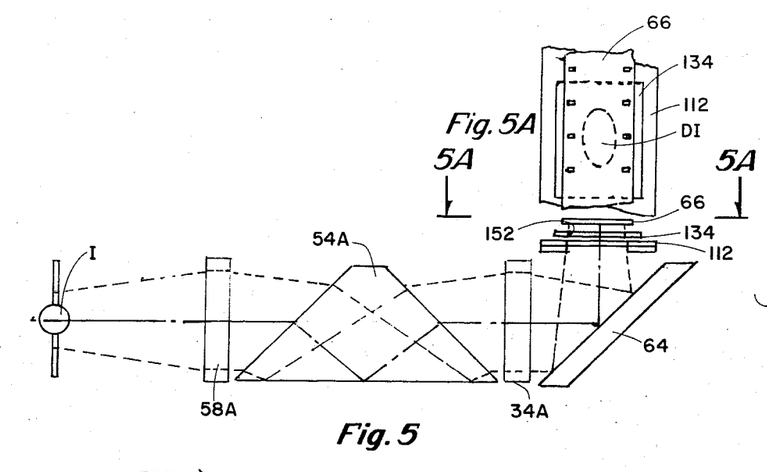
FIG. 5 is a schematic view of an optical system such as may be utilized in the invention.
FIG. 5A is a view taken on line 5A — 5A of FIG. 5.
Figures 5B, 7:
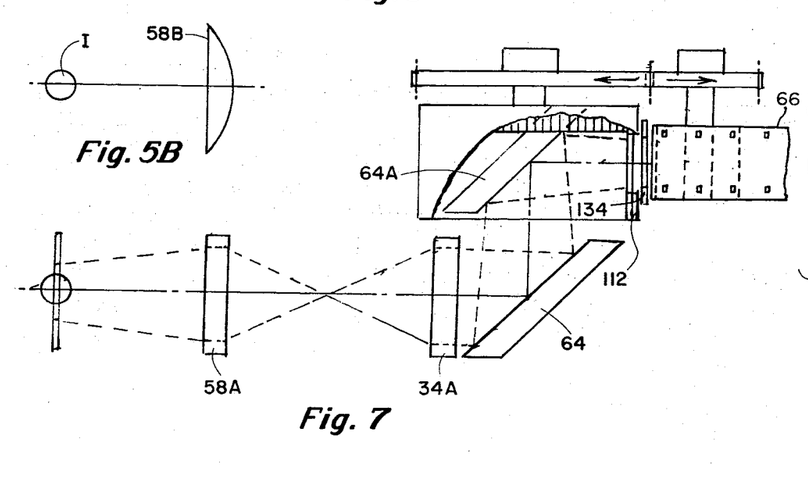
FIG. 5B is a view of a modified lens for the invention.
FIG. 7 is a schematic view of a cylindrical lens system as may be utilized in the invention.

Referring now to FIGS. 5, 5A, 5B and 6, it will be seen that a cylindrical lens system generally similar to the lens system illustrated in FIG. 1, is shown. However, in the system shown in FIG. 5, a dove prism 54a is provided having cylindrical lenses 34a and 58a disposed in spaced relationship thereto and on the opposite sides thereof instead of the lenses 34 and 58 shown in FIG. 1. (FIG. 5B illustrates a modified cylindrical lens 58b which may be utilized in the invention.) The lenses 34a and 58a are cylindrical type lenses wherein magnification occurs in one direction only. In this cylindrical type lens system, the slits 113 on the shutter belt 112 are spaced therealong at the proper distance for spanning the height of the magnification, as is particularly shown in FIG. 6. Whereas the magnification may be of any desired size, it is preferable that the magnification be two to one, and the rate of the shutter speed be one slit for each frame of film. It will be apparent that with a two time magnification in one direction only, the image I (which in this instance is depicted as a circle) will produce an oval or distorted elongated image in the form of an oval as shown at DI during the passage of the image through the cylindrical optical optical system.

Figure 6:
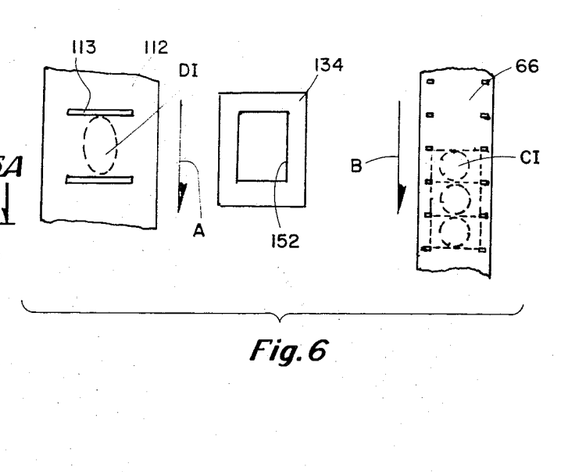
FIG. 6 is a view of a correction of a distorted image as the film moves across the secondary aperture for exposure.

The direction of movement of the shutter belt 112 is in the same direction as the direction of movement of the film 66 as indicated by the arrows A and B, respectively. In order to compensate for the distortion of the image ID, the shutter belt 112 must move at a rate of speed faster than the speed of travel of the film 66 whereby a slit 113 will expose an entire frame of the film during the movement of one frame. Thus, the oval or distorted image DI is compressed to a circle again and the distortion is corrected as shown at CI while the flim 66 and shutter belt 112 are in motion.

Figure 8:
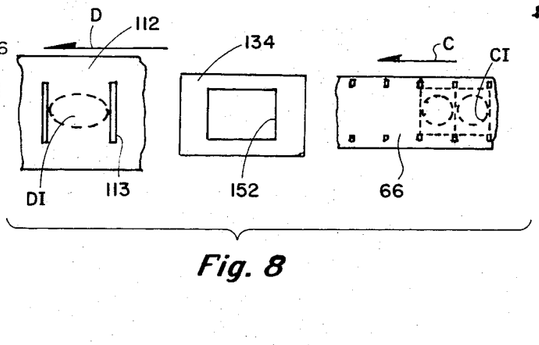
FIG. 8 is a view similar to FIG. 6, which results in the operation of the lens system shown in FIG. 7.

FIGS. 7 and 8 are generally similar to FIGS. 5, 5A, and 6, and illustrate a lense system which may be utilized with the usual or standard motion picture camera of today which does not utilize the epicyclic principle. In this instance, the cylindrical lenses 58a and 34a may be spaced apart, with the dove prism eliminated therebetween. The image I is transmitted through the lenses 58a and 34a with magnification in one direction only, as hereinbefore set forth, and is reflected by the reflector 64 to a second similar reflector 64a disposed in substantial alignment with and at an angle substantially parallel with respect thereto. The image is reflected from the second reflectors 64a to the film 66 through the shutter belt 112. Of course, the shutter is not limited to the belt type, but may be of any suitable type. Here again, the slits 113 of the shutter belt 112 are spaced apart a distance sufficient to span the height of the magnification, as hereinbefore set forth, and the film 66 and shutter belt 112 move in a common direction as indicated by the arrows C and D, respectively, with the speed of movement of the belt being sufficiently greater than the speed of the film 66 for compensation of the distortion of the image DI and correction of the image upon exposure of the film as shown at CI.

With the use of the cylindrical type lens systems, the picture is distorted and corrected while the film 66 and shutter belt 112 are moving. The laws of optics and the laws of mechanics in a static state are not compatible, but if motion is added to it, a compensating means is created.

Figure 3:
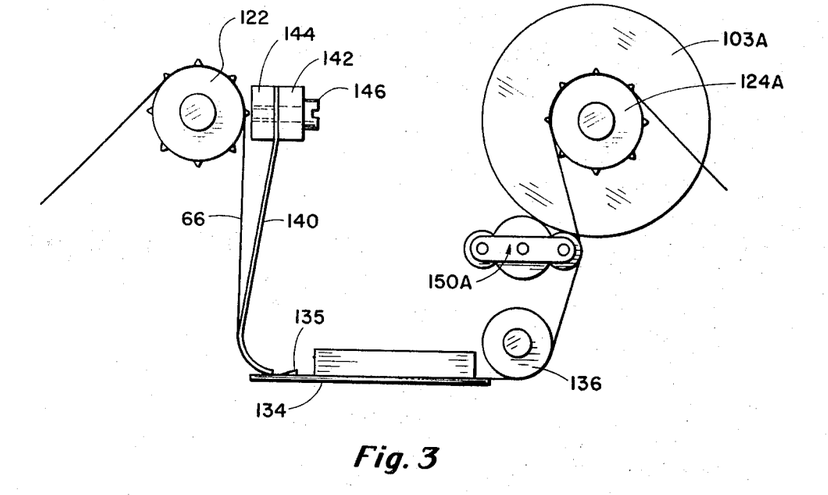
FIG. 3 is a side elevational view of a sprocket drive system used in the invention, particularly depicting a polygon sprocket and long dwell mechanism.

Referring now to FIG. 3, a modified dwell mechanism is shown. In this embodiment, a gear 103a is provided in lieu of the gear 103, with the size of the gear 100 being altered in order that the gear ratio between the gear 100 and gear 103a being approximately four to one. A sprocket 124a is provided in alignment with the gear 103a and rotatable simultaneous therewith, in lieu of the polygon sprocket 124. A suitable ball bearing assembly 150a is secured to the flange 62 in any well known manner and is interposed between the roller 136 and sprocket 124a for engagement with the film 66. The film 66 passes over the sprocket 112, across the guide plate 134, around the roller 136 and ball bearing assembly 150a and over the sprocket 124a, as clearly shown in FIG. 136.

A suitable knob K (FIG. 1) may be secured to the other end of the shaft 42 in any suitable manner for manual actuation of the gear train 48–46–40–38 for adjusting the orientation of the prism 54 prior to the initiating of a filming operation in order to assure that the image position will be properly orientated in accordance with the desired end picture result. It is to be noted that the reflector 64 is preferably disposed at an angle of 45° with respect to the longitudinal axis of the prism 54.

When the motor 18 is activated in the usual manner, the gear 30 is rotated by the gear 20 and gear belts 32 as hereinbefore set forth. The take-up reel 86 takes up the slack in the film, only, and is rotated through the pulley or gear and belt mechanism 88–90–96 and shaft 78. The housing 24 and hub 26 rotate simultaneously with the gear 30, being integral therewith, thus rotating the lens means 34. The shaft 92 moves around the longitudinal axis of the hub 26 as the flange 62 of the housing 24 rotates. The shaft 92 is connected with the bracket 60 by means of a connecting member 60a, and as the shaft 92 rotates about the axis of the hub 26, the bracket 60 is rotated simultaneously therewith for rotation of the reflector 64.

As the hub 26 rotates, the gear 38 rotates simultaneously therewith and transmits rotation to the gear 40 through the belt 45. The rotation of the gear 40 is transmitted to the gear 46 through the shaft 42, and rotation is transmitted from the gear 46 to the gear 48 through the belt 53. The sleeve 80 is rotated simultaneously with the gear 48 for transmitting rotation to the prism 54. The sleeve 50 is rotated at a speed one-half that of the rotational speed of the hub 26 because of the gear ratio between the gears 40 and 46 for rotating the dove prism 54 at half the speed of the rotation of the reflecting element 64. This maintains the image constant of the aperture 113 and on the film 66 during exposure thereof. It is to be noted that the aperture 152 is of substantially the same size as the aperture in the usual C-mount when the camera 10 is designed for use with 16mm film.

In operation, the film supply reel 84, having an adequate length of film 66 spooled thereon, may be disposed in the camera 10, as is well known. The film 66 is threaded or directed from the supply reel 84 to the take-up reel 86 in a manner generally similar to that disclosed in my aforementioned patent. The film 66 is threaded or directed from the supply reel 84 over the outer periphery of a flanged roller 126a (FIG. 2) secured in alignment with the roller 126, and is twisted ninety degrees as shown in FIG. 2, and passes over the outer periphery of the flanged roller means 114 whereby the direction of travel of the film strip 66 is changed for passage around the outer periphery of the roller 126. From the roller 126 the film strip 66 moves over the first sprocket 122, behind and under the loop spring 140, across the bracket or film guide plate 134, under the rollers 136 and 138, over or around the sprocket 124, and over the roller 128. From the roller 138 the film 66 moves over the flanged roller means 118 in a manner similar to that set forth in my aforementioned patent, is again twisted at ninety degrees and passes over a flanged roller 128a which is suitably secured in axial alignment with the roller 128, and onto the take-up reel 86. The sprockets 122 and 124 prevent stretching of the film in a fast moving film speed operation. The take-up reel 86 is driven by the shaft 78, and the clutch 98 precludes free wheeling of the supply reel 84 to keep the film from becoming loose at the supply reel.

As hereinbefore set forth, the sprockets 122 and 124 are preferably mounted on suitable shafts 95 and 95a, respectively, which are journalled in the flange 62 and extend therethrough. The gears 101 and 103 are carried on the outer ends of the shafts 95 and 95a, respectively. When the housing 24 is rotated by means of the gears 20 and 30 and gear belt 32, the gears 101, 102 and 103 move simultaneously with the flange 62 and thus rotate about the longitudinal axis of the hub 26 in the manner of planets around a sun. The gear 100 remains stationary, as hereinbefore set forth, and as the gears 101, 102 and 103 move therearound during rotation of the housing 24, the belt 104 transmits rotation to the gears 101, 102 and 103 for transmitting rotation to the pulleys 122 and 124 and flanged gear 106.

The shutter belt 112 is driven simultaneously with the rotation of the gear 106 which is rotated by the movement oF the gear 102 around the stationary gear 100, as hereinbefore set forth. The movement of the shutter belt 112 moves the slits 113 successively across the aperture 152 of the film guide plate 134. The slits 113 prints the image on the film 66 as it traverses the frame. It is to be noted that the number of teeth in the stationary gear 100 must be in multiples equal to the number of frames in one revolution. This is also true of the sprockets 122 and 124 and the shutter gear 106. For example, if 16mm film is being used, 32 pitch and three teeth equal one frame. Each time an opening or aperture 113 moves across the opening or aperture 152 the film strip 66 disposed in alignment with the aperture 132 is exposed to the image being carried by the optical system. Of course, the speed of rotation of the gear 30 may be substantially any desired speed in accordance with the gear tooth ratio between the gear 30 and the gear 102. The greater the number of teeth of the gear 30 the slower the mechanical rotational speed thereof. It will be readily apparent that the epicyclic operation of the camera 10 in combination with the dove prism or cylindrical lens system permits an extremely high speed filming operation without the necessity of extremely high rotational speeds of the operating members or elements of the camera.

The invention is in no manner limited to the exposure of any particular number of frames per revolution. The number of frames per revolution which may be exposed depends on the ratio between the stationary gear and the planet gear driving the shutter mechanism. The film is disposed at the focal point of the lens and this focal point may be at any distance from the lens as the mechanical elements of the camera permit. Furthermore, the movement of the film is started rapidly in a high speed camera operation, which usually results in stretching of the film, but the sprocket arrangement of the present camera substantially eliminates stretching of the flim. During the filming operation, the picture image being transmitted to the film for exposure stays stationary with respect thereto, which the dove prism does by cancelling the tumbling of the image produced by the forty five degree reflector. The effect actually is that the film is stationary in space while the objective lens scans the landscape or object being filmed.

It is to be understood that the epicyclic camera principle disclosed herein may not only be utilized efficiently for high speed filming operations, as hereinbefore set forth, but also may be used for improving the efficiency of slo speed filming operations. There is no intention of limiting the invention to the use of high speed filming only.

Furthermore, a suitable eyepiece (not shown) similar to that shown in my aforementioned patent may be provided for removable attachment to the camera 10 and a suitable focusing screw S may be suitably secured to the rear face of the flange 62 for facilitating adjustment of the eyepiece as is well known.

The polygon sprocket is provided for the purpose of producing variable velocity of the film so that during the reduced velocity it can be made to coincide with the image velocity. During the coincidence of the film and image, the film is retained against the register pin 135 by the loop spring 140 for the duration of the exposure. The spring 140 must have a period or frequency equal to the frame rate. The polygon sprocket system achieves this, but the salient point is that the film never stops even when in coincidence as the image never stops. Because of this the camera can do more work; it has more time; it exposes in motion.

In the epicyclic camera system disclosed herein, the nodle point of the lens is always located on the center of the epicyclic system, that is at the center or axis of the stationary gear. The nodel point of the lens is normally at the location of the iris stop. In a projection lens system, the nodle point is theoretically at any distance. The virtual image may be treated as the object and the nodle point would then depend on the focal length of the projection lens. It has been found to be desirable to maintain the nodel point on the centerline or longitudinal axis of the stationary gear or gear pulley. However, the ideal camera design has been found to be predicated on the fact that the focal point of the lens is on the pitch line of the stationary gear and that the emulsion side of the film strip is on the pitch line of said gear at the position thereof wherein the image is being exposed thereon. This, in essence, keeps the film stationary in space.

In a filming operation with the epicyclic camera as disclosed herein, a fast moving object is elongated on the exposed film if the object is moving in the direction of the scan, and shortened if the object is moving in the opposite direction of the scan. However, the distortion of the picture does not change the resolving efficiency of the lens system.

From the foregoing it will be apparent that the present invention provides a novel high speed motion picture camera utilizing an epicyclic action in combination with a dove prism type reflecting system which permits dynamically balanced high speed operation without excessive high mechanical speeds of the working elements thereof. In addition, the camera is particularly designed and constructed for admitting all the light possible into the camera and maintaining the loss of light passing through the camera at a minimum to permit efficient high speed filming in sunlight not heretofore possible. The principle of the invention may be applied to substantially any film sizes and film speeds, and the exposure of substantially any number of frames per revolution may be obtained by selection of the proper ratio between the stationary gear and planet gear. The novel camera is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. In a motion picture camera, power driven housing means rotatable about its longitudinal axis and having a central hub and flange member, stationary gear means secured concentrically with respect to the hub and spaced from one side of the flange, shutter means carried by the flange and disposed on the opposite side of the flange, first gear and belt drive means carried by the flange substantially coplanar with the stationary gear means and operably connected with the shutter means for actuation of the shutter means upon rotation of the housing means, power driven film strip take-up reel means, free wheeling film strip supply reel means, sprocket means carried by the flange and engagable with the film strip for moving the film strip across the shutter means, second gear and belt means carried by the housing means and connected between the stationary gear means and sprocket means for rotation of the sprocket means during rotation of the housing means, reflector means carried by the housing means and rotatable simultaneously therewith, sleeve means carried by the central hub and independently rotatable with respect thereto, optical means carried by the sleeve means and rotatable therewith, third gear and belt means connected between the hub and sleeve means for rotating the sleeve means at half the rotational speed of the hub, and lens means cooperating with the optical means and the reflector means for transmitting a light beam to the film strip moving across the shutter means.

2. In a motion picture camera, the combination as set forth in claim 1 wherein the optical means includes a dove prism for receiving the light beam and transmitting the light beam with a minimum of loss of light.

3. In a motion picture camera, the combination as set forth in claim 1 wherein the lens means includes cylindrical lens means which magnifies in one direction only.

4. In a motion picture camera, the combination as set forth in claim 1 wherein the reflector means comprises a reflecting element carried by the flange and disposed at an angle of approximately forty five degrees with respect to the axis of the optical means for receiving the light beam from the optical means and reflecting the beam to the film strip for exposure thereof.

5. In a motion picture camera, the combination as set forth in claim 1 wherein the lens means comprises an objective lens for initially receiving the light beam, first lens element means interposed between the objective lens and optical means for transmitting the light beam therebetween, and second lens element means interposed between the optical means and reflector means for transmitting the light beam therebetween.

6. In a motion picture camera, the combination as set forth in claim 1 wherein the film strip take-up reel means and film strip supply reel means comprises a take-up reel secured to a power driven shaft and rotatable thereby and a film strip supply reel loosely mounted on said shaft substantially coaxial with the take-up reel and independently rotatable with respect thereto, and clutch means engagable with said film strip supply reel for controlling the free rotation thereof.

7. In a motion picture camera, the combination as set forth in claim 1 wherein the first and second gear and belt means comprises planet gear members carried by the rotatable housing means substantially co-planar with the stationary gear and movable therearound during rotation of the housing means whereby the belts extending around the stationary gear and planet gears transmit rotation to the planet gears.

8. In a motion picture camera, the combination as set forth in claim 1 wherein the sprocket means includes one sprocket having an outer periphery of a polygon configuration for receiving the film strip therearound.

9. In a motion picture camera, the combination as set forth in claim 1 wherein adjusting means is provided for manual adjustment of the third gear and belt means for initial orientation of the optical means to provide a preselected positioning of an image transmitted to the film strip by the light beam.

10. In a motion picture camera, the combination as set forth in claim 1 wherein dwell means comprising a loop spring and retaining pin means is provided for receiving the film strip therearound.

11. In a motion picture camera, the combination as set forth in claim 1 and including means to retain the film strip stationary in space.

12. In a motion picture camera, the combination as set forth in claim 1 and including means for locating a nodal point on the axis of the optical means.

13. In a motion picture camera, the combination as set forth in claim 1 and including means to maintain a nodal point in the center of the reflecting means.

14. In a motion picture camera, the combination as set forth in claim 1 including means to maintain the focal point of the lens on the pitch line of the stationary gear means.

15. In a motion picture camera, the combination as set forth in claim 1 including means to maintain the film strip on the pitch line of the stationary gear means at the position of the film being exposed by the shutter means.

16. In a motion picture camera, the combination as set forth in claim 1 including means to retain the focal point of the lens on the pitch line of the stationary gear means, and means to maintain the film strip on the pitch line of the stationary gear means at the position of the film being exposed by the shutter means.

17. In a motion picture camera, the combination as set forth in claim 16 and including means for locating a nodal point on the axis of the optical means, and means to keep the nodal point on the center of the reflecting means.

18. In a motion picture camera, the combination including film strip supply reel means, film strip take-up reel means, shutter means, film advancing means engageable with the film strip for moving the film strip from the film strip supply reel means and across the shutter means and onto the film strip take-up reel means, optical means for receiving an image and directing the image to the film strip through the shutter means, said optical means including lens means which distorts the image by magnification of the image in one direction only, and said shutter means being provided with means for compensating for said distortion upon transmitting the image onto the film strip.

19. In a motion picture camera, the combination as set forth in claim 18 wherein the lens means includes a cylindrical lens which magnifies in one direction only.

20. In a motion picture camera, the combination as set forth in claim 18 wherein the shutter means cooperates with the moving film strip for exposing thereof across a film frame in a manner to compensate for said distortion.

21. In a motion picture camera, the combination as set forth in claim 18 wherein the optical means transmits a light beam to reflector means for transmitting the image to the film strip through a ninety degree bend of the light beam.

* * * * *